US009372004B2

(12) United States Patent
Sikkenga et al.

(10) Patent No.: US 9,372,004 B2
(45) Date of Patent: Jun. 21, 2016

(54) FILTER UNITS, FILTRATION METHODS, AND FILTRATION SYSTEMS

(71) Applicant: Blissfield Manufacturing Company, Blissfield, MI (US)

(72) Inventors: Daniel W. Sikkenga, Adrian, MI (US); Christopher L. Schultz, Onsted, MI (US); Thomas A. Parott, Blissfield, MI (US); Richard L. Ricker, Blissfield, MI (US); Antonio R. Galvan, Adrian, MI (US); Brian A. Ford, Blissfield, MI (US); Frederick D. Morrison, Sylvania, OH (US); Patrick D. Farver, Adrian, MI (US); Bruce A. Eppink, Sylvania, OH (US)

(73) Assignee: Blissfield Manufacturing Company, Blissfield, MI (US)

( * ) Notice: Subject to any disclaimer, the term of this patent is extended or adjusted under 35 U.S.C. 154(b) by 210 days.

(21) Appl. No.: 14/338,665

(22) Filed: Jul. 23, 2014

(65) Prior Publication Data

US 2014/0345461 A1    Nov. 27, 2014

Related U.S. Application Data

(63) Continuation-in-part of application No. 13/230,114, filed on Sep. 12, 2011, now Pat. No. 8,852,307, and a continuation-in-part of application No. 12/880,051, filed on Sep. 10, 2010, now Pat. No. 8,945,263, and a continuation-in-part of application No. 12/807,653, filed on Sep. 10, 2010, now Pat. No. 8,728,189.

(51) Int. Cl.
*B01D 45/08*    (2006.01)
*F24C 15/20*    (2006.01)
*B01D 45/16*    (2006.01)

(52) U.S. Cl.
CPC ............ *F24C 15/2035* (2013.01); *B01D 45/08* (2013.01); *B01D 45/16* (2013.01); *F24C 15/2042* (2013.01); *Y10S 55/36* (2013.01)

(58) Field of Classification Search
CPC ....................................................... B01D 45/08
USPC ................. 55/434.2, 440, 443, 444, DIG. 36; 165/158
See application file for complete search history.

(56) References Cited

U.S. PATENT DOCUMENTS 3,260,189 A    7/1966  Jensen
3,698,378 A    10/1972  Rosenberg
(Continued)

FOREIGN PATENT DOCUMENTS

BE    899292    7/1984
EP    0021809   1/1981
(Continued)

*Primary Examiner* — Robert A Hopkins
(74) *Attorney, Agent, or Firm* — Hartman Global IP Law; Gary M. Hartman; Domenica N. S. Hartman

(57) ABSTRACT

A filter unit, system and method for removing grease, oil and other particulates from air. The filter unit includes a housing having upstream and downstream walls and a cavity therebetween. The upstream wall has an entrance opening aligned with a downstream wall portion, and the downstream wall has first and second exit openings aligned with first and second upstream wall portions. A heat exchanger is disposed within the cavity and includes first and second upstream conduits within the entrance opening and first and second downstream conduits within the first and second exit opening. The entrance and exit openings are arranged to define S-shaped air flow paths through the housing between the entrance and exit openings, each of which flows around a downstream side of one of the upstream conduits then around an upstream side of one of the downstream conduits before exiting through one of the exit openings.

20 Claims, 9 Drawing Sheets

(56) References Cited

U.S. PATENT DOCUMENTS

| | | |
|---|---|---|
| 3,827,343 A | 8/1974 | Darm |
| 4,050,368 A | 9/1977 | Eakes |
| 4,084,745 A | 4/1978 | Jones |
| 4,122,834 A | 10/1978 | Jacobs |
| 4,175,614 A | 11/1979 | Huggins |
| 4,235,220 A | 11/1980 | Hepner |
| 4,350,504 A | 9/1982 | Diachuk |
| 4,437,867 A | 3/1984 | Lerner |
| 4,769,149 A | 9/1988 | Nobilet |
| 5,456,244 A | 10/1995 | Prasser |
| 5,524,607 A | 6/1996 | Grohman |
| 5,540,744 A | 7/1996 | Renna |
| 5,558,080 A | 9/1996 | Grohman |
| 5,687,707 A | 11/1997 | Prasser |
| 6,344,074 B1 | 2/2002 | Ward |
| 6,543,526 B2 * | 4/2003 | Jacobs ............... F24C 15/2035 126/299 D |
| 8,728,189 B2 | 5/2014 | Prasser |
| 8,852,307 B2 | 10/2014 | Sikkenga et al. |
| 8,945,263 B2 | 2/2015 | Sikkenga et al. |

FOREIGN PATENT DOCUMENTS

| | | |
|---|---|---|
| EP | 0036659 | 9/1981 |
| FR | 2443033 | 6/1980 |
| FR | 2482703 | 11/1981 |
| SU | 522377 | 9/1976 |

* cited by examiner

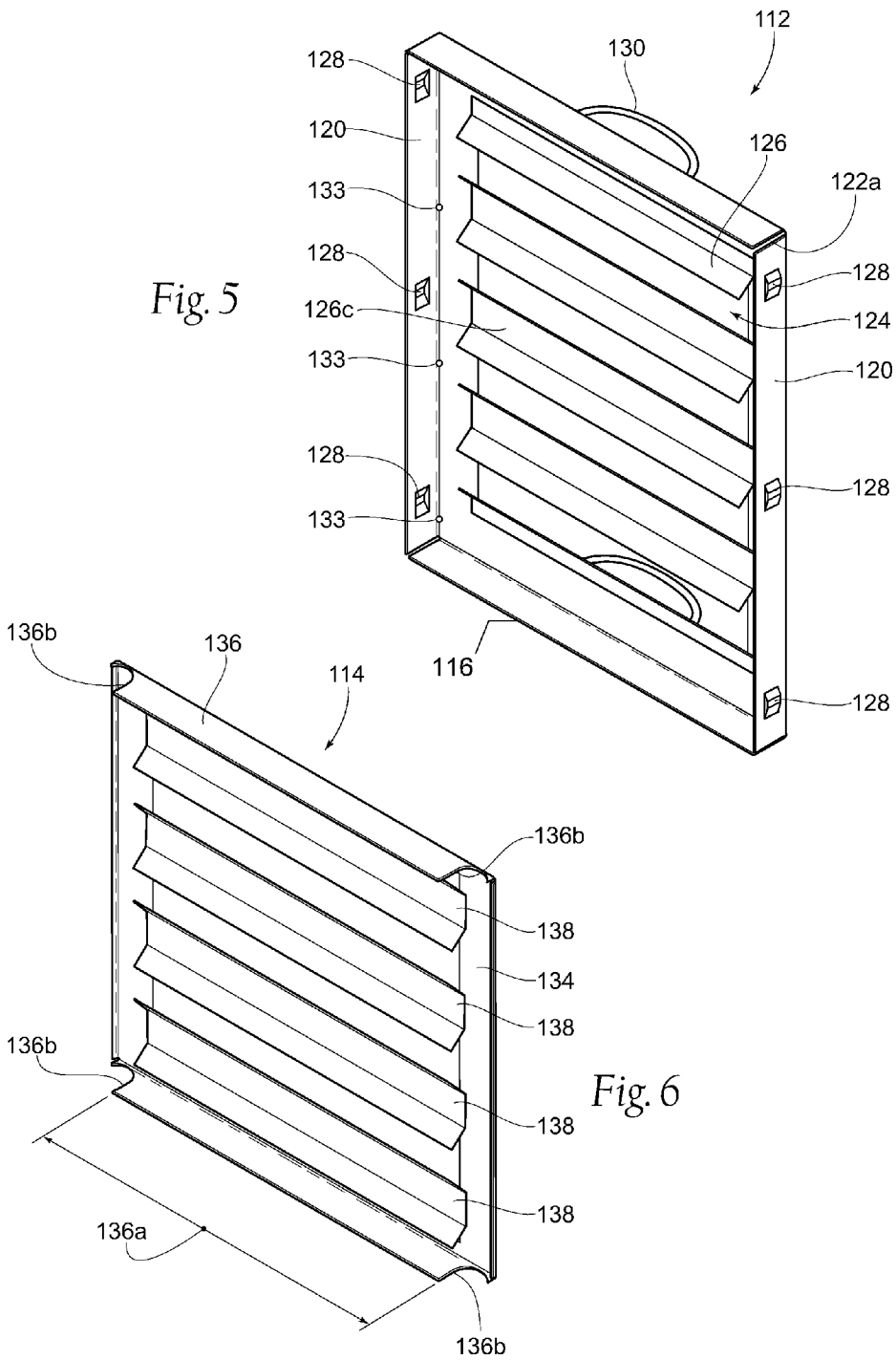

FILTER UNITS, FILTRATION METHODS, AND FILTRATION SYSTEMS

BACKGROUND OF THE INVENTION

The present invention generally relates to filters of the type used in cooking environments to remove grease, oil and other particulates from the air. More particular, the invention relates to a filter unit and method for filtering grease, oil and particulates from hot fumes and transferring heat from the hot fumes to a fluid circulating within the unit. The heated fluid may then be used to supply heat for purposes such as heating water or air.

During the operation of commercial or institutional kitchens, a significant amount of valuable heat energy is lost as a result of hot fumes and/or air being vented to the atmosphere. These hot fumes are generated from cook stoves, hot plates, deep fat fryers, and other cooking apparatus. As a result of such extreme heat and variety of particulates generated during cooking, it is necessary for the comfort and health of kitchen workers to exhaust these fumes, usually on a continuous basis, through flue chimneys or similar venting devices. This process effectively replaces the hot kitchen air with cooler, clean outside air. Although this circulation process is necessary to provide a constant source of clean air to the kitchen environment, this venting practice is both inefficient and uneconomical, especially in colder climates where the cost to heat internal air and water is significant.

A further problem encountered in commercial kitchens is the filtering of grease, oil and other particulates entrained in the hot fumes generated during the cooking of foods. If improperly filtered, entrained grease, oil and particulates can cause fouling and the eventual malfunction of air ventilation systems, as well as create fire hazards if allowed to accumulate. Accordingly, hot fume air filters, which are normally located in fume hoods over cooking surfaces, are generally required to be cleaned daily or at a minimum several times a week. This tedious cleaning process is both time consuming and expensive.

The use of heat exchangers to capture thermal energy above cooking surfaces has been known for years. These designs, however, position the heat exchangers substantially downstream of existing filtration units intended to filter grease, oil and other particulates. This approach is unfavorable for a number of reasons. First, these designs are inefficient since the heat exchanger is located downstream of the filtration unit and a significant distance from the heat source. Thus, valuable thermal energy is lost by absorption into the filtration unit and through general dissipation prior to the heat reaching the exchanger. Second, conventional grease filtration units can significantly impede air flow, especially when congested with grease and oil, hence reducing the efficiency of the air ventilation system and the efficiency of a heat exchanger downstream of the filtration unit. Third, when the heat source is turned off, grease quickly solidifies on filters and heat exchange, and must be removed for both safety and efficiency. Finally, despite the existence of these types of heat exchangers generally, many existing kitchens fail to incorporate any kind of heat exchanger due to integration costs. Retrofitting existing kitchen equipment with heat exchanger systems may require an entirely new flue hood assembly and substantial piping and accessories. This conversion is both time consuming and expensive. While some improvements have been made to combine a filter and heat exchanger, such as in U.S. Pat. No. 5,456,244, there remains room for improvement in the art. For instance, there is a desire for a filter unit having a simplified construction that uses less material and achieves greater heat transfer rates than prior devices.

BRIEF DESCRIPTION OF THE INVENTION

The present invention provides filter units and methods for removing grease, oil and other particulates from air, for example, in a kitchen environment.

According to one aspect of the invention, a filter unit includes a housing having an upstream wall disposed at an upstream side of the housing, a downstream wall disposed at a downstream side of the housing, and a cavity therebetween. The upstream wall has a first entrance opening therein and first and second upstream wall portions separated by the first entrance opening. The downstream wall has first and second exit openings therein and a downstream wall portion between the first and second exit openings. The first entrance opening is disposed in the upstream wall so as to be aligned with the downstream wall portion, and the first and second exit openings are disposed in the downstream wall so as to be aligned with, respectively, the first and second upstream wall portions. The filter unit further includes a heat exchanger disposed within the cavity of the housing. The heat exchanger has fluid flow conduits comprising at least first and second upstream conduits within the first entrance opening, a first downstream conduit within the first exit opening, and a second downstream conduit within the second exit opening. First and second entrance fins are provided adjacent the first entrance opening, and first and second baffles are provided adjacent, respectively, the first and second exit openings. The first entrance opening, the first and second exit openings, the first and second entrance fins, and the first and second baffles are configured and arranged to define first and second S-shaped air flow paths through the housing between the first entrance opening and the first and second exit openings. Furthermore, air entering the first entrance opening flows between the first and second upstream conduits and is then separated into first and second flow portions. The first flow portion flows around a downstream side of the first upstream conduit, then between the first entrance fin and the first baffle, then around an upstream side of the first downstream conduit, then exits the housing through the first exit opening. The second flow portion flows around a downstream side of the second upstream conduit, then between the second entrance fin and the second baffle, then around an upstream side of the second downstream conduit, then exits the housing through the second exit opening.

According to another aspect of the invention, a method of filtering air uses a filter unit as described above by drawing air through the housing and collecting grease and oil particulates on the first and second entrance fins and the first and second baffles.

Other aspects of the invention include filtration systems using at least one filter unit comprising the elements described above. For example, such a system may include a cooking surface that has a heat source and an exhaust system adapted to draw gasses rising from the cooking surface through a gas flow path that passes through the filter unit.

Other aspects and advantages of this invention will be better appreciated from the following detailed description.

BRIEF DESCRIPTION OF THE DRAWINGS

FIG. 5 represents a perspective view of the base of the housing shown in FIG. 2.

FIG. 6 represents a perspective view of the cover of the housing shown in FIG. 2.

DETAILED DESCRIPTION OF THE INVENTION

Figure 1:
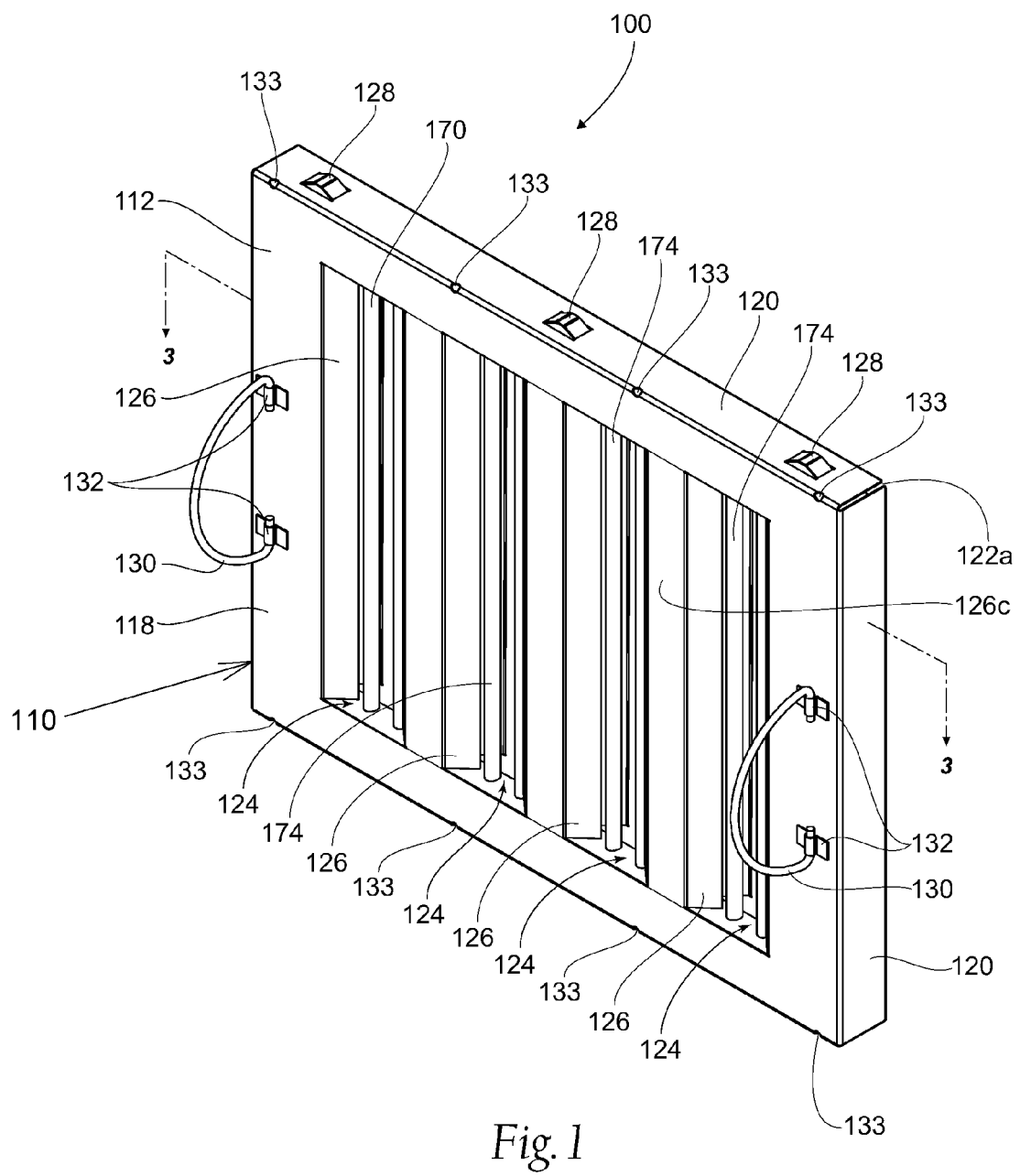
FIG. 1 is a perspective view of a filter unit in accordance with an embodiment of this invention.

FIG. 1 depicts a filter unit (cartridge) 100 and FIGS. 2 through 6 depict components of the unit 100 in accordance with an embodiment of the present invention. The filter unit 100 comprises a housing 110 and a heat exchanger 170. The heat exchanger 170 is preferably sized so as to be positioned substantially within a cavity 122 within the housing 110, and can be formed to be rotationally symmetrical in at least one plane such that it may be inserted into the cavity 122 in a plurality of orientations. As evident from FIG. 2, the housing 110 shown in FIG. 1 preferably comprises a base 112 and a cover 114. The base 112 may be formed in a configuration that is substantially a parallelepiped with an open top 116. If formed as such, the base 112 includes a base wall 118 and a plurality of lateral sidewalls 120. The base 112 may be formed from a cruciform shape that is stamped or otherwise formed out of a generally planar sheet material. Once stamped, the lateral sidewalls 120 may be bent towards each other, thus forming the cavity 122 of the housing 110. Alternatively, the sidewalls 120 may be coupled to the base wall 118, such as by welding. There may be a gap 122a between adjacent sidewalls 120 or the gap 122a may be closed with a sealant or welded. Additionally or alternatively, the plurality of sidewalls 120 may be formed as a unitary member, such as in a ring formation, and coupled to the base wall 118.

The base wall 118 is preferably perforate, including one or more openings 124 formed therethrough, to allow air to pass into the housing cavity 122 through the base wall 118. Various shapes of the base wall 118 are contemplated, although a generally planar, rectilinear shape is preferred for ease of manufacture and installation. In addition, such shape is easily adaptable to be utilized with filter assembly units, or exhaust hoods, that are presently provided in commercial cooking settings. Furthermore, it is preferred that the shape of the filter unit 100 be at least laterally symmetrical, such that the unit 100 may be inserted into a given hood or exhaust assembly in a plurality of orientations, so as to provide ease of connectivity. In particular, the filter unit 100 is preferably rotationally symmetrical in at least one plane.

The openings 124 formed in the base wall 118 of the base 112 preferably perform at least a slight nozzling function on air entering the housing 110. As represented in FIGS. 1 through 3 and 5, this can be accomplished by an arrangement of pairs of fins 126 adapted to extend from the openings 124 and towards each other. To help illustrate, two pairs of the fins 126 are labeled in FIG. 3 as fins 126a and 126b. As evident from FIG. 3, each opening 124 is preferably wider at its upstream side 124a and narrower at its downstream side 124b. The fins 126 may be formed from the same material as the base wall 118, and may be stamped and formed from the same piece of material as the base wall 118 and then bent into the housing cavity 122. In FIGS. 3 and 5, the fins 126 are represented as separate components that are preferably stationarily coupled with respect to the base wall 118. In FIGS. 3 and 5, sets of fins 126 are coupled together with a fin plate 126c disposed between the two fins 126 to yield a unitary member. Each fin plate 126c may have a substantially planar surface that extends along its length, with end portions of the plate 126c secured to the base wall 118. The preferred nozzling function provided by the arranged fins 126 focuses the airflow towards baffles 138 (FIG. 2) that are included on the cover 114, or at least disposed on the opposite side of the heat exchanger 170 from the fins 126, to assist in the collection of grease particles. Also as later discussed, the direction of airflow creates a turbulent airflow to increase exposure time of the air with the heat exchanger 170. Accordingly, it is preferred that no direct airflow path is provided through the filter assembly 110, or at least a majority of the airflow therethrough is not direct. Rather, one or more tortuous flow paths 150 are created thereby allowing for a turbulent flow that exposes the heated air to the heat exchanger 170 for a sufficient amount of time to allow for adequate heat exchange to a fluid contained therein.

Also on the base 112, one or more retainer tabs 128 are preferably formed on at least one of the lateral side members 120, preferably on two opposing lateral side members 120. A preferred retainer tab 128 is a punched extrusion from the lateral side member 120 so as to form a spring type retention force. Also provided on the base 112 is at least one and preferably a plurality of handles 130, which may be formed in a variety of ways. Preferably, the handles 130 are provided in opposing positions on the assembly 100 to allow for balanced insertion and removal of the filter unit 100. The preferred handles 130 are full or partial wire loop handles that are suspended from handle brackets 132 that may be formed integrally with or coupled to the base wall 118.

In addition to acting as a heat exchanger, a filter unit 100 according to the present invention may serve as an air filter which assists in the collection of grease particles, which is especially advantageous for use above commercial cooking surfaces. To aid in the drainage of collected grease particles, the base 112 may be provided with one or more drain holes 133 formed therethrough. A plurality of drain holes 133 is preferred, and they may be formed along the juncture of one or more of the lateral side members 120 and the base wall 118.

Figure 2:
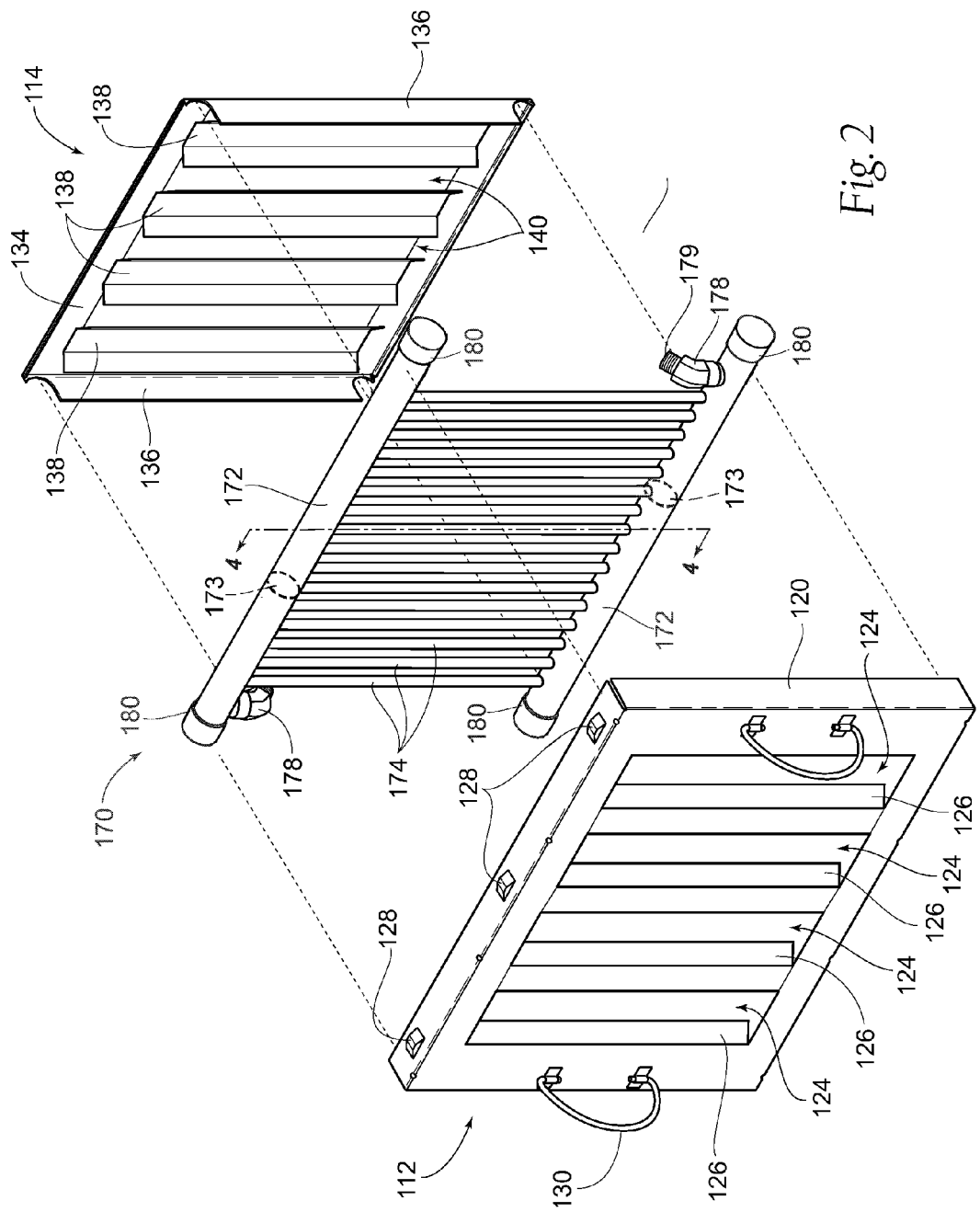
FIG. 2 represents an exploded view of the filter unit of FIG. 1, and shows a heat exchanger and a housing comprising a base and cover.
Figure 3:
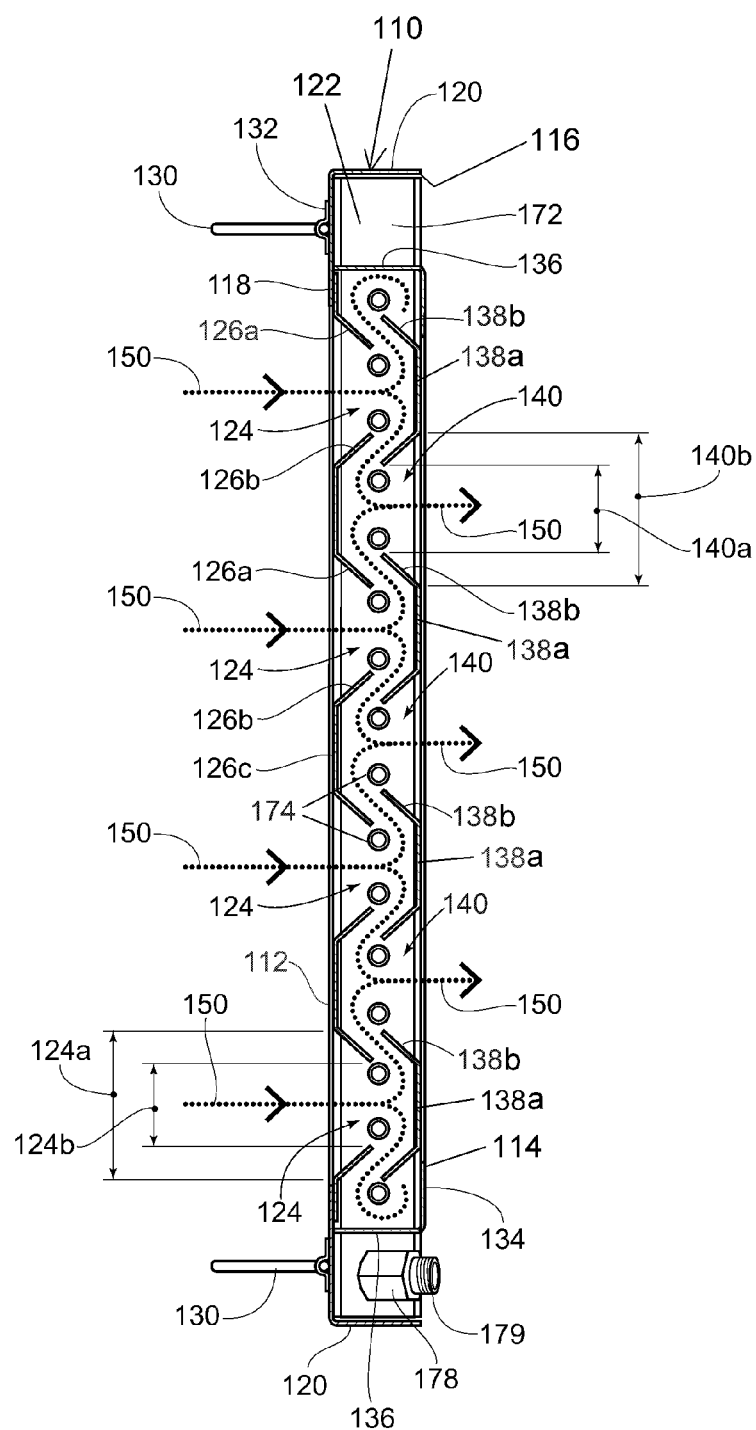
FIG. 3 represents a cross-sectional view of the filter unit taken along section line 3-3 of FIG. 1.

The cover 114 is represented in FIGS. 2, 3 and 6 as comprising a plate 134 and lateral side members 136 that extend from the plate 134. As indicated in FIG. 6, the side members 136 may be provided in a length 136a that allows insertion of the side members 136 between header pipes 172 of the heat exchanger 170. Furthermore, the side members 136 may be formed with one or more heat exchanger interfaces 136b, which may contact and/or surround a portion of the heat exchanger 170 to maintain position during and after installation. The cover 114 may be formed as a symmetrical shape that may be inserted into the base 112 in a plurality of orientations. Formed integrally with or coupled to the plate 134 are the previously noted baffles 138, which are disposed opposite the openings 124 formed in the base 112 so as to assist in creating the tortuous flow paths 150 through the filter unit 100. The baffles 138 are preferably arranged to act as one or more diffusers, such that the upstream side 140a of openings 140 defined between the baffles 138 is smaller than the downstream side 140b. The baffles 138 may be formed to have a unitary construction similar or identical to that described for the fins 126 above. It is believed that the nozzle effect provided by the base 112 and the diffuser effect on the cover 114 is able to assist in the creation of the tortuous flow paths 150 to aid in the collection of grease and to maximize or assist in the heat transfer to fluid flowing through the heat exchanger 170, for example, a potable fluid such as water or propylene glycol.

The filter base 112 and cover 114 are preferably formed from a stainless steel, though other materials are foreseeable, for example, aluminum, copper and other steel alloys. A plastic housing could also be used, but is not generally preferred due to a desirability for durability in cleaning and repair. Further, plastic has demonstrated affections for grease, which may be caused by its insulative properties, and therefore it may require more frequent cleaning.

Figure 4:
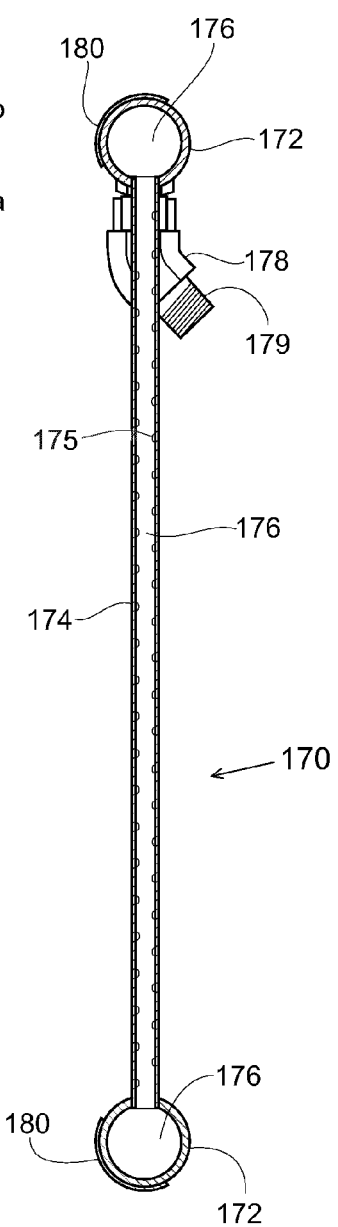
FIG. 4 represents a cross-sectional view of the heat exchanger taken along section line 4-4 of FIG. 2.

The heat exchanger 170 is represented in FIGS. 2 and 4 as comprising the aforementioned header pipes 172 and a plurality of fluid flow conduits (tubes) 174 extending between the header pipes 172. Such arrangement provides a fluid flow chamber 176 within the header pipes 172 and conduits 174, through which a fluid flows. As represented in FIG. 2, though the conduits 174 have a parallel arrangement, dams 173 are preferably present within the header pipes 172 to create a serpentine flow path for the fluid flowing through the heat exchanger 170. However, it is also foreseeable that the dams 173 could be eliminated to result in a parallel flow configuration for the heat exchanger 170. In the embodiment of FIG. 2, each header 172 is provided with a fluid port 178 in fluid communication its fluid flow chamber 176. The ports 178 may be provided with threads 179 or other coupling mechanism, such as a standard fluid quick connect coupling, to be connected to a fluid supply or drain. Preferably, as shown, the ports 178 are provided on opposite ends of their respective header pipe 172. The opposite ends of the header pipes 172 are shown as being closed with caps 180, which can also serve as standoffs that cooperate with the base wall 118 of the base 112 to prevent rattling that might result from relative movement between the heat exchanger 170, base 112 and cover 114 during operation of the filter unit 100.

A preferred material for one or more, and preferably a majority, of the components of the heat exchanger 170 is copper, in which case a copper braze alloy can be used to join together the components of the heat exchanger 170. Exterior surfaces of the heat exchanger 170 are preferably coated with an adhesion-reducing material, such as a coating containing polytetrafluoroethylene (PTFE), a commercial example of which is available under the name ULTRALON® OC-412 from the Whitford Corporation. The non-stick material may be applied to those components of the heat exchanger that would benefit from easier cleaning of grease, oil and other contaminants that collect on the heat exchanger 170 during the operation of the filter unit 100. As an example, the heat exchanger 170 may be cleaned with the use of an automatic dishwasher. Other materials for the heat exchanger 170 are foreseeable and within the scope of the invention.

In use, the filter unit 100 can be inserted into a filter housing or holding unit above a cooking surface. As can be seen in the cross-section of FIG. 3, the combination of the fins 126 and baffles 138 create the tortuous (non-sightline) flow paths 150 for exhaust air to enter through the base wall 118 and exit through the cover plate 134. The flow paths 150 are directed around the fluid flow conduits 174 included in the heat exchanger 170. Accordingly, a majority of the conduits 174 are exposed directly to heated air flow, and not just a portion thereof. Such exposure combined with the turbulent nature of the airflow mechanism helps with the efficiency of the device. Additionally, the interiors of the conduits 174 can be formed to have a surface texture, for example, dimples 175 or other form of turbulators, to inhibit laminar flow through the conduits 174 and thereby promote heat transfer between the conduits 174 and the fluid flowing therethrough.

In FIG. 3, the tortuous flow path 150 through the cavity 122 of the housing 110 results in incoming air impinging the baffles 138. In particular, FIG. 3 shows the incoming air as impinging the surfaces 138a of the baffles 138 that are oriented transverse to the initial direction of airflow as it enters the housing 110 through the openings 124 in the base 112. Each transverse surface 138a of each baffle 138 is located between a pair of converging walls 138b of the baffle 138 that define the openings 140 to either side of the baffle 138 and redirect the airflow toward the conduits 174 of the heat exchanger 170. The process of the air impacting the surfaces 138a of the baffles 138 initiates separation of entrained particulates from the incoming air. In a kitchen environment, such particulates are likely to include grease, oil and other matter that may be entrained in the incoming air. The particulates that collect on the baffles 138 coalesce and flow on the surfaces of the baffles 138 toward the end of the housing 110 where the drain holes 133 are located.

As also evident from FIG. 3, the airflow that is redirected toward the conduits 174 of the heat exchanger 170 impinge the interior surfaces of the fins 126, particularly the fin plates 126c of the fins 126. The process of the air impacting the surfaces of the fin plates 126c causes separation of additional particulates that may remain entrained from the air. As with the baffles 138, the particulates that collect on the fins 126 and their fin plates 126c coalesce and flow toward the end of the housing 110 where the drain holes 133 are located.

In combination, the baffles 138 and fins 126 cause the air flowing through the housing 110 to flow to the downstream side of each heat exchanger conduit 174, and then flow around the upstream side of an adjacent conduit 174 before being allowed to exit the housing 110 through one of the openings 140 between the baffles 138—effectively resulting in the flow paths 150 having an S-shape. As such, the majority of the air flows either around the downstream side of a conduit 174 located within an upstream portion of one of the flow paths 150 (i.e., an "upstream conduit"), or around the upstream side of a conduit 174 located within a downstream portion of the flow path 150 (i.e., a "downstream conduit"), but generally not both. As evident from FIG. 3, the upstream conduits 174 are exposed within the openings 124 of the base 112 to the air entering the housing cavity 122, and the downstream conduits 174 are disposed within the openings 140 of the cover 114 through which the air exits the housing cavity 122. Notably, the conduits 174 of the heat exchanger 170 shown in FIGS. 1 through 4 are not equipped with fins of types commonly used and mounted directly to heat exchanger conduits (tubes), for example, fin plates through which the conduits pass or sinusoidal fins between conduits. While traditional fins would promote heat transfer from the air flow to the conduits 174, their absence can reduce the tendency for the heat exchanger 170 to become fouled by grease, oil and other contaminants borne in the air flow. The tortuous S-shaped flow paths 150 through the heat exchanger at least partially compensate for the absence of traditional fins.

Figures 7A, 7B:
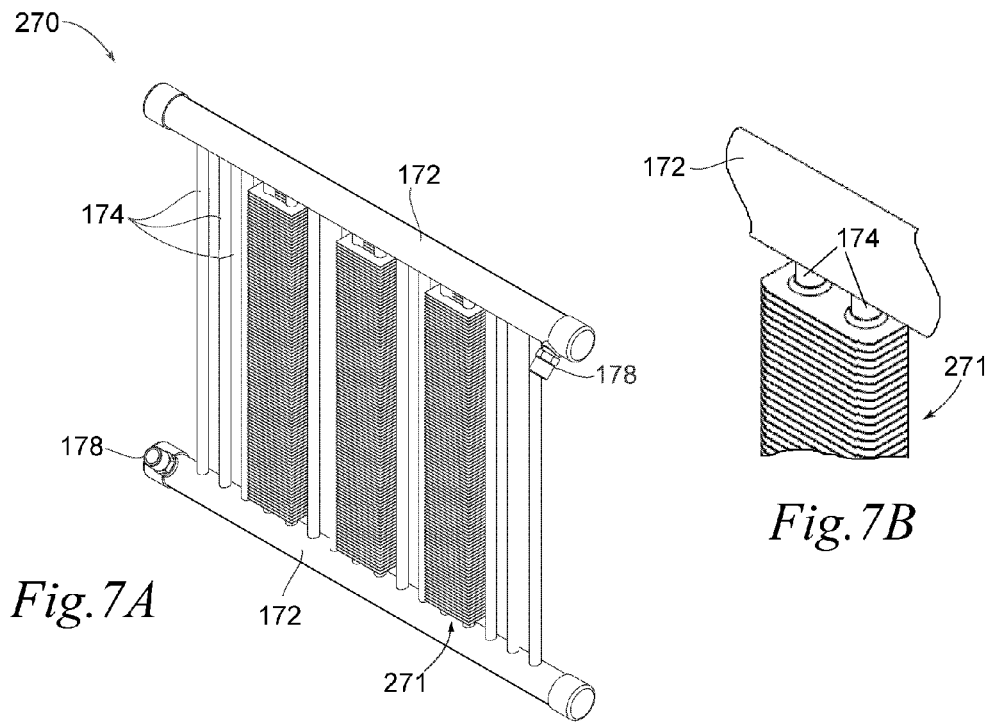
FIG. 7A represents a perspective view of an alternative embodiment of the heat exchanger of FIGS. 1 through 4.
FIG. 7B represents a detailed perspective view of an alternative fin configuration to that shown in FIG. 7A.
Figures 8, 9:
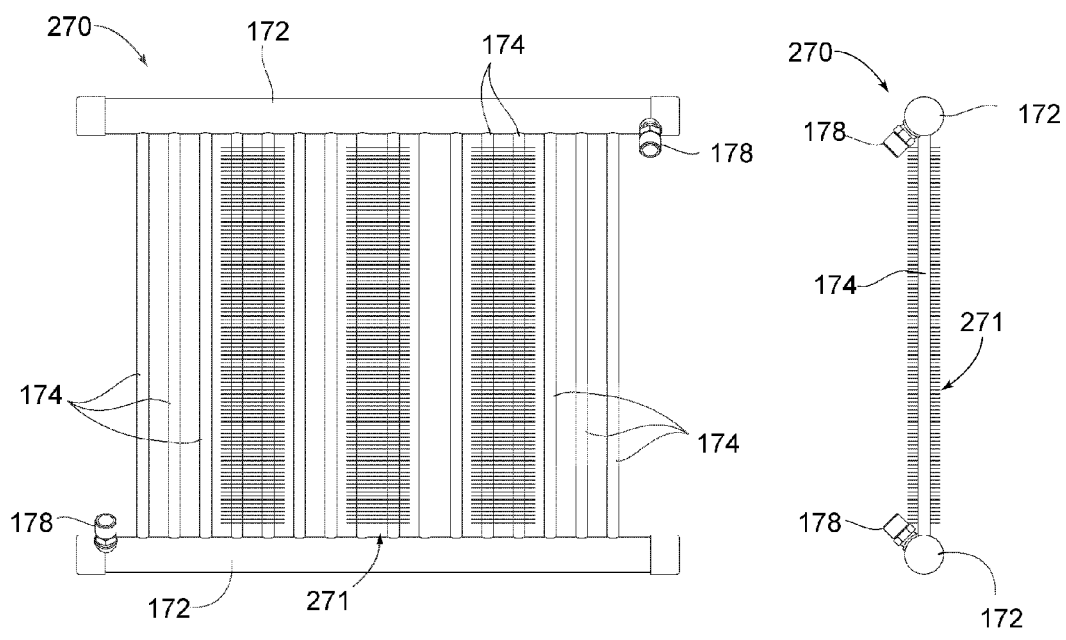
FIGS. 8 and 9 represent, respectively, rear, and end views of the heat exchanger of FIG. 7A.
Figure 10:
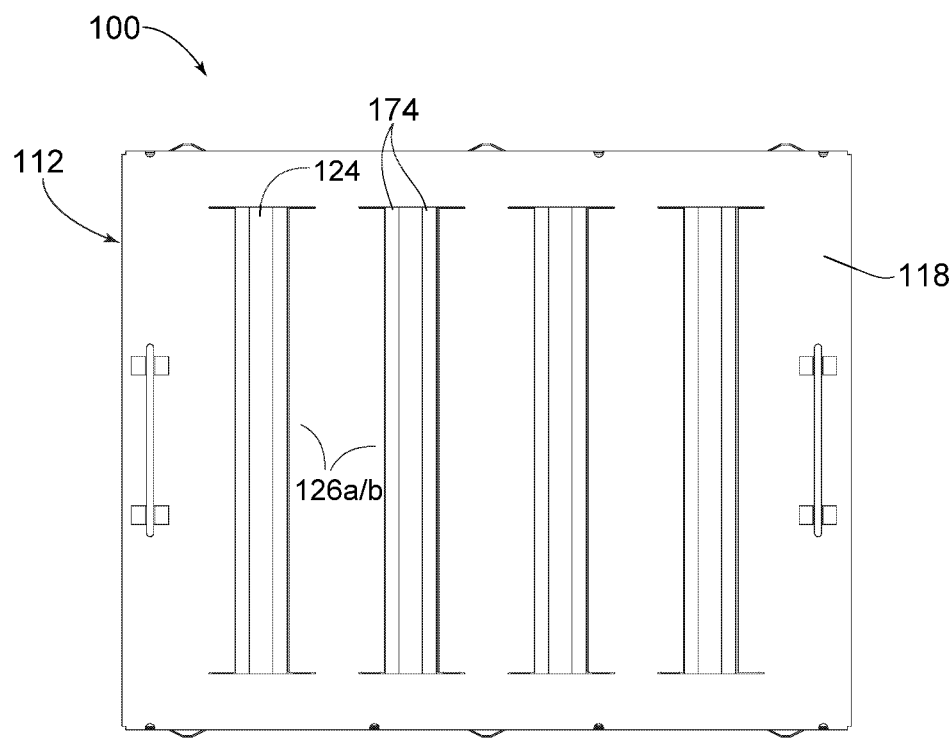
FIGS. 10 and 11 represent, respectively, front and rear views of a filter unit equipped with the heat exchanger of FIGS. 7A, 8, and 9.
Figure 11:
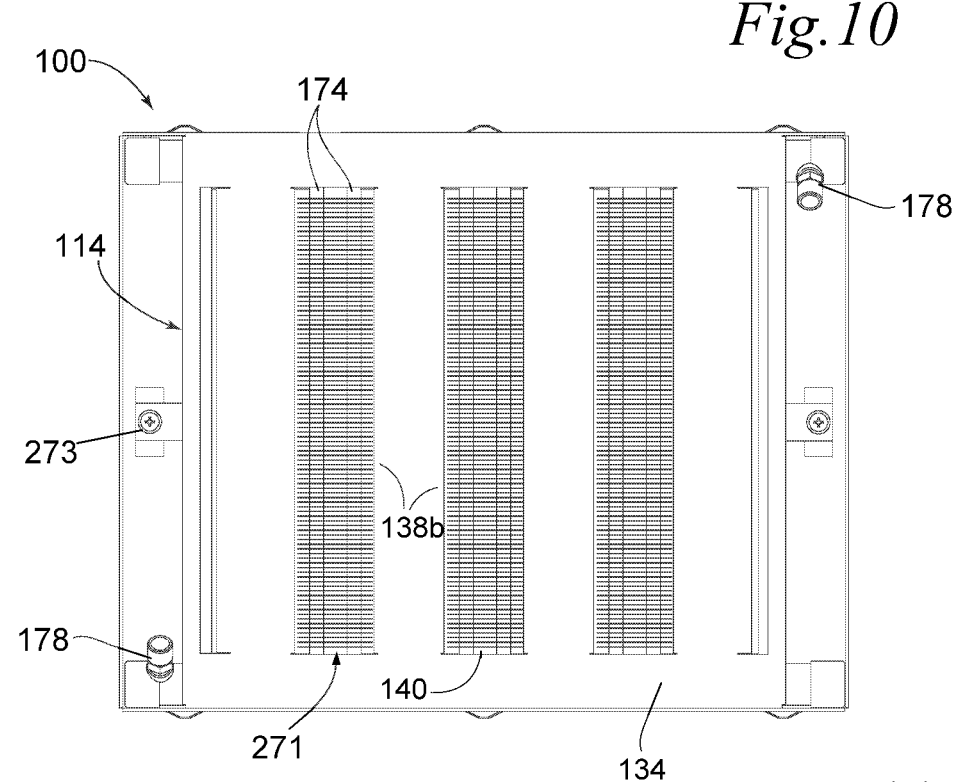

FIGS. 7A, 8 and 9 represent, respectively, perspective, rear, and end views of an alternative embodiment of a heat exchanger 270, and FIGS. 10 and 11 represent, respectively, front and rear views of a filter unit equipped with the heat exchanger of FIGS. 9 through 11. Because the filter unit can be otherwise identical to that shown in FIG. 1, the filter unit of FIGS. 10 and 11 is also identified by the reference number 100. The heat exchanger 270 notably differs from the heat exchanger 170 shown in FIGS. 1 through 4 by the inclusion of fins 271. The fins 271 will hereinafter be referred to as tube fins 271 for the purpose of differentiating the fins 271 from the fins 126 associated with the openings 124 in the base wall 118. The heat exchanger 270 also differs from the heat exchanger 170 shown in FIGS. 1 through 4 by the utilization of fasteners 273 that secure the cover 114 to the base 112 to provide for easy disassembly of the unit 100 and removal of the heat exchanger 270.

The tube fins 271 are represented in FIGS. 7A, 8 and 9 as plate-type through which the conduits 174 pass, though it should be understood that the tube fins 271 could be of a sinusoidal type disposed between immediately adjacent conduits 174. The tube fins 271 are shown as being installed on less than all of the conduits 174, and more particularly on only the downstream conduits 174 that are visible from the rear of the unit 100, as evident from a comparison of FIGS. 10 and 11. In the front view of FIG. 10, the tube fins 271 are concealed by the wall 118 of the base 112 and the fins 126 mounted thereto, and in the rear view of FIG. 11 the tube fins 271 are visible through the openings 140 in the plate 134 of the cover 114. As such, the tube fins 271 are located so as to be within a downstream portion of the tortuous S-shaped flow paths 150 depicted in FIG. 3, and the majority of the incoming air would flow around the downstream side of the upstream conduits 174 lacking the tube fins 271, and then around the upstream side of the downstream conduits 174 equipped with the tube fins 271. Though not wishing to be held to any particular theories, it is believed that grease will largely condense on the fin-less upstream conduits 174 within the upstream portion of the path 150, such that the air will contact the finned downstream conduits 174 after at least some and preferably most of the grease has been removed. The location of the tube fins 271 also addresses the fact that, in comparison to the temperature differential that exists at the upstream conduits 174 adjacent the upstream openings 124, a lower temperature differential exists between the air and the downstream conduits 174 adjacent the downstream openings 140. The tube fins 271 can be installed in any suitable manner that will provide good thermal contact and conduction between the tube fins 271 and the conduits 174 on which they are mounted, such that the downstream conduits 174 may have a greater heat transfer rate than the fin-less upstream conduits 174 exposed to incoming air through the openings 124.

FIG. 7B represents plate-type tube fins 271 that differ from the tube fins 271 represented in FIGS. 7A, 8 and 9. Whereas each individual fin 271 of the latter comprises a single "dog-bone" shaped opening that accommodates two conduits 174, each individual fin 271 of the former comprises a separate opening for each conduit 174, with each opening surrounded by a collar that promotes thermal contact with the conduits 174. In addition, the corners of the tube fins 271 represented in FIG. 7B are rounded.

In investigations leading to the invention, a grease extraction capability of about 14:1 was achieved with an S-shaped flow path 150 essentially as represented in FIG. 3. In addition to promoting the thermal efficiency of the heat exchanger 170 and the removal of particulates from the air, this flow path 150 also serves as a flame barrier through the housing 110 and, therefore, through the filter unit 100. In particular, investigations with a filter unit configured as represented in FIGS. 1 through 3 showed that the S-shaped flow path 150 through the housing 110 enabled the filter unit to pass applicable standards of Underwriter Laboratories, Inc., for inflammability.

Figure 12A:
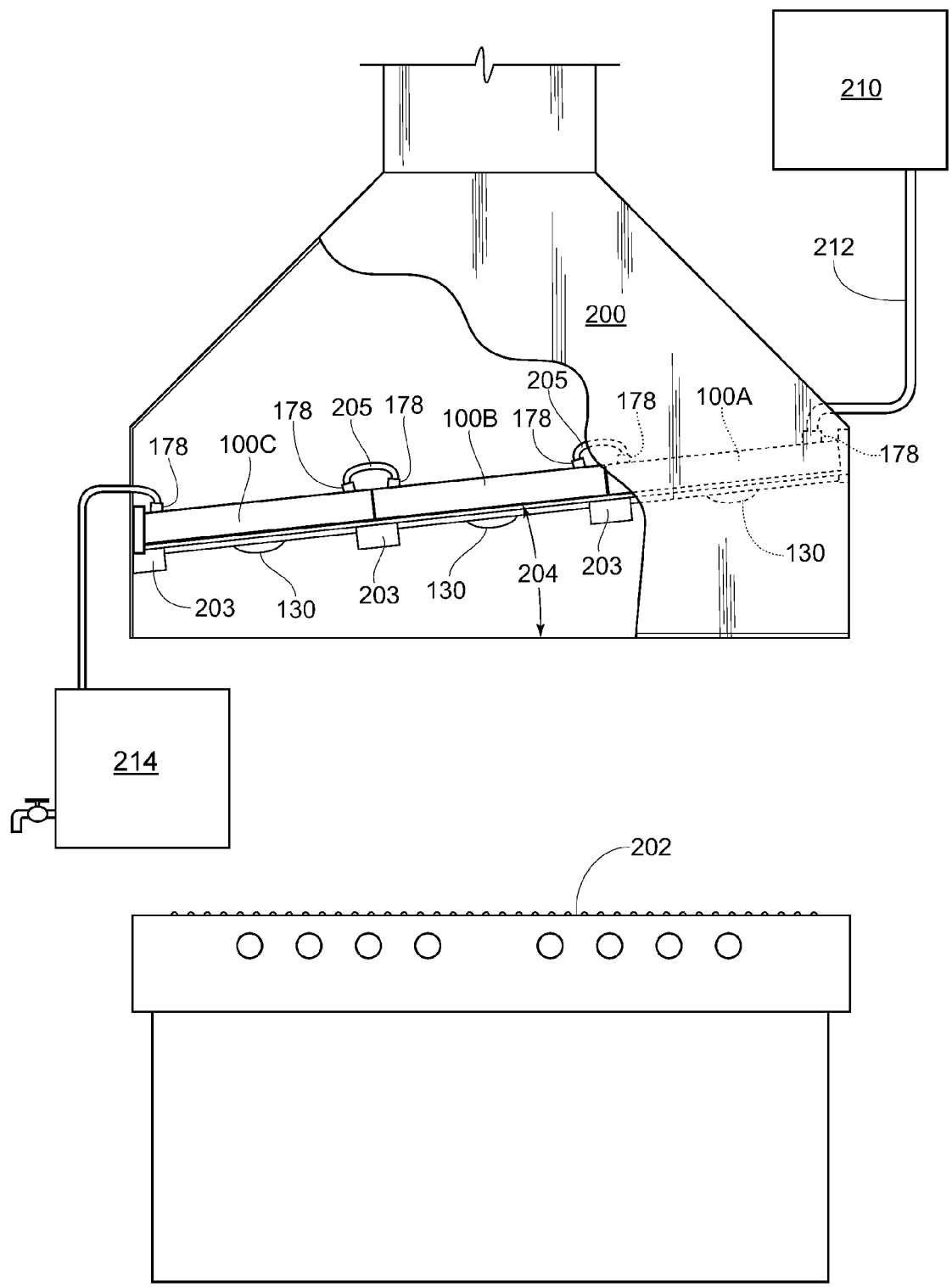
FIG. 12A schematically represents an installation for the filter units of FIGS. 1, 10 and 11 in accordance with an embodiment of this invention.

Generally, systems and methods according to the present invention may be used to collect heat generated by a cooking surface, which would otherwise be wasted as exhaust, and transfer such heat to other locations for use in an open or closed circulation system. As can be seen in FIG. 12A, one or more filter units 100 may be installed in an exhaust housing 200, preferably above a cooking surface 202. While the filter 100 could be installed at any desirable angle, such as parallel to horizontal level, it is preferably installed at an angle 204 relative to horizontal level, for example, about 12 degrees to about 45 degrees for most efficient drainage of collected oil particles, thus disposing the longitudinal dimension of the fins 124 and baffles 138 at approximately such angle. Collected oil preferably drains through the drain holes 133 and into one or more grease traps 203. As further shown in FIG. 12A, a plurality of filter units 100 may be coupled together to form an expanded filter unit system. The units 100 may be coupled in series, as shown, or in parallel. If coupled in series, the first filter unit 100A in the series can be coupled to a fluid supply line 212, a coupler 205 can be used to connect the drain port 178 of the filter unit 100A to the supply port 178 of a subsequent filter unit 100B, and so on, with the final filter unit 100C in the series being coupled to a storage tank 214. If coupled in parallel, the supply port 178 of each unit 100A-C would be coupled to the fluid supply line 212 and the drain port 178 of each unit 100A-C would be coupled to the storage tank 214.

A system utilizing any one or more of the filter units 100 discussed above may be an open system, such as when the heated fluid is removed from the system and put to some other use, such as dishwashing, or stored for future use. FIG. 12A depicts an open system. Water or other desirable fluid may be provided by gravity pressure, such as from an elevated supply tank 210 or municipal water supply, or it may be pumped to the system. The fluid supply line 212 and standard connections can be used to couple the first filter unit 100A to the supply tank 210. The fluid flows through the one or more filter units 100, and then drains into the storage tank 214 for future use, such as being pumped to a dishwasher, hot water supply in a restroom, or used for other purposes.

Figure 12B:
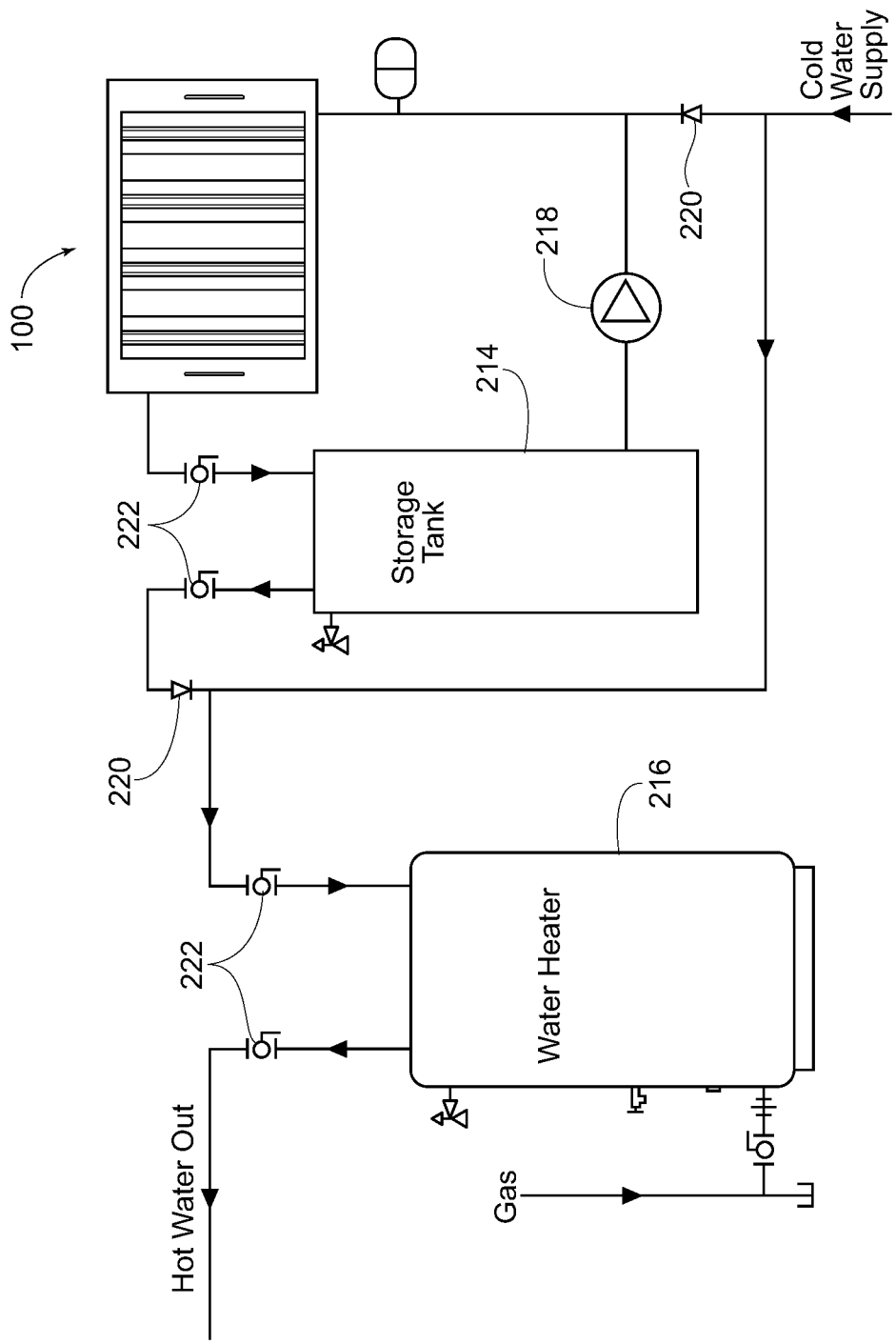
FIG. 12B is a schematic of a plumbing system containing the filter unit of FIG. 1 in accordance with another embodiment of this invention.

Another embodiment of an open system is represented in FIG. 12B. In addition to the storage tank 214, the enhanced system includes a water heating tank 216 and a recirculating pump 218. The plumbing diagram of FIG. 12B will be readily understood by a person having ordinary skill in the art as including various check valves 220 and shut-off valves 222 in desired positions. One advantage to the system of FIG. 12B is that if fluid usage does not keep up with the supply of heated fluid, fluid stored in the storage tank 214 may be recirculated to keep it warm in the event of demand increase. The recirculating pump 218 may be selectively activated and deactivated, such as on a timed schedule or based upon a measured temperature of the fluid in the storage tank 214 falling below a predetermined threshold.

Figure 13:
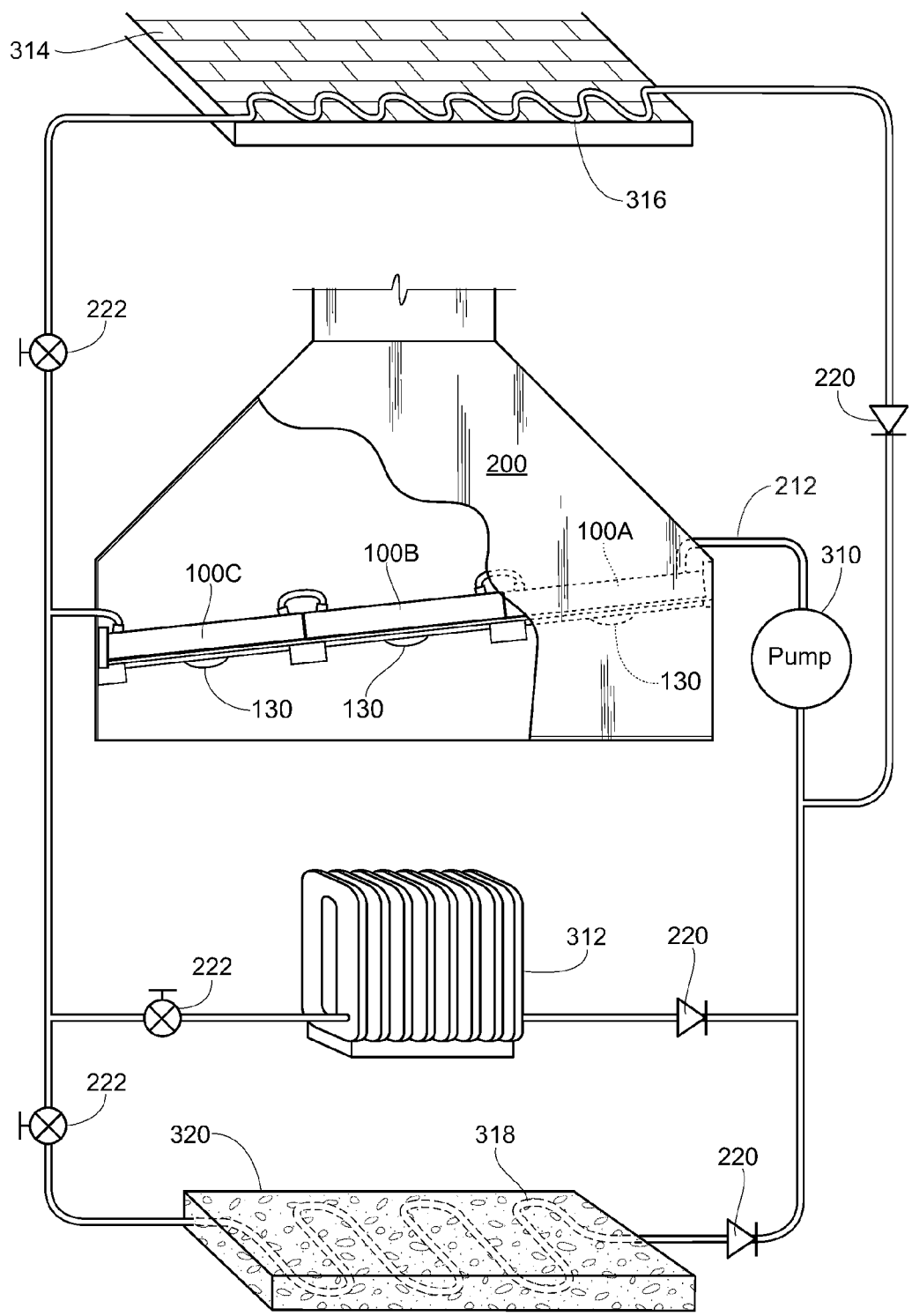
FIG. 13 schematically represents an installation for the filter units of FIGS. 1, 10 and 11 in accordance with yet another embodiment of this invention.

Additionally or alternatively, the system may be a closed system, where the goal may be to transfer the heat from the exhaust gases to a desired use elsewhere. An example of a closed system is shown in FIG. 13. In this system, water or other fluid is introduced into the closed system and substantially all of any residual air is purged. The fluid is represented as being pumped through the system by an inline pump 310, through the fluid supply line 212 and through one or more filter units 100. After traveling through the one or more filter units 100, in which the fluid was heated by exhaust from the cooking surface 202, the fluid may then be caused to travel through one or more additional heat exchangers. For instance, the fluid may be pumped through a radiator 312 to heat a room. Additionally or alternatively, the fluid may be pumped through a roof heat exchanger 314 disposed along the edge of the roof 316 of the building in which the system is housed to prevent ice damming along the roof edge. Additionally or alternatively, the fluid may be pumped through a sidewalk heat exchanger 318 disposed beneath or embedded in a concrete or other external walkway 320 to reduce the buildup of ice thereon. It is to be appreciated that the function of a system according to the present invention may be changed depending upon the time of year. For instance, in summer months, it may not be desirable to use a closed system for heating purposes as described. In such situations, the fluid may remain static and the filter units 100 may simply be used to collect oil particulates from the exhaust air. Alternatively, the closed system could be changed to an open system in the summer months, thereby providing hot water for use.

While the invention has been described in terms of a specific embodiment, it is apparent that other forms could be adopted by one skilled in the art. For example, the physical configuration of the filter units 100 could differ from those shown, and materials and processes other than those noted could be used. Therefore, the scope of the invention is to be limited only by the following claims.

The invention claimed is:

1. A filter unit comprising:
a housing having an upstream wall disposed at an upstream side of the housing, a downstream wall disposed at a downstream side of the housing, and a cavity therebetween, the upstream wall having a first entrance opening therein and first and second upstream wall portions separated by the first entrance opening, the downstream wall having first and second exit openings therein and a downstream wall portion between the first and second exit openings, the first entrance opening being disposed in the upstream wall so as to be aligned with the downstream wall portion, the first and second exit openings being disposed in the downstream wall so as to be aligned with, respectively, the first and second upstream wall portions;
a heat exchanger disposed within the cavity, the heat exchanger having fluid flow conduits comprising at least first and second upstream conduits within the first entrance opening, a first downstream conduit within the first exit opening, and a second downstream conduit within the second exit opening;
tube fins attached directly to the first downstream conduit and tube fins attached directly to the second downstream conduit, wherein the heat exchanger does not have any fins attached directly to the first and second upstream conduits;
first and second entrance fins adjacent the first entrance opening;
first and second baffles adjacent, respectively, the first and second exit openings;
wherein the first entrance opening, the first and second exit openings, the first and second entrance fins, and the first and second baffles are configured and arranged to define first and second S-shaped air flow paths through the housing between the first entrance opening and the first and second exit openings; and
wherein air entering the first entrance opening flows between the first and second upstream conduits and is then separated into first and second flow portions, the first flow portion flows around a downstream side of the first upstream conduit, then between the first entrance fin and the first baffle, then around an upstream side of the first downstream conduit and through the tube fins attached thereto, then exits the housing through the first exit opening, and the second flow portion flows around a downstream side of the second upstream conduit, then between the second entrance fin and the second baffle, then around an upstream side of the second downstream conduit and through the tube fins attached thereto, then exits the housing through the second exit opening.

2. The filter unit according to claim 1, wherein the first and second entrance fins obliquely extend toward each other into the cavity from the first and second upstream wall portions, respectively, and partially across the first entrance opening.

3. The filter unit according to claim 1, wherein the first and second baffles obliquely extend away from each other into the cavity from the downstream wall portion and partially across the first and second exit openings, respectively.

4. The filter unit according to claim 1, wherein the heat exchanger comprises first and second header pipes, and the fluid flow conduits are disposed between and in fluid communication with the first and second header pipes.

5. The filter unit according to claim 1, further comprising a baffle surface between the first and second baffles, wherein the baffle surface is impacted by the air after the air enters the first entrance opening and flows between the first and second upstream conduits but before the air separates into first and second flow portions.

6. A method of filtering air using the filter unit according to claim 1, the method comprising drawing air having grease and oil particulates entrained therein through the housing and then collecting the grease and oil particulates on the first and second entrance fins and the first and second baffles, wherein the air contacts the first and second downstream conduits and the tube fins thereof after most of the grease and oil particulates have been removed from the air.

7. A system comprising:
a cooking surface including a heat source;
an exhaust system adapted to draw in gasses that are disposed above the cooking surface, the exhaust system providing a gas flow path for the gasses;
the filter unit of claim 1 disposed in the gas flow path; and
a fluid supply and a drain line coupled to the heat exchanger of the filter unit.

8. The filter unit according to claim 1, wherein the tube fins attached directly to the first downstream conduit are separate from the tube fins attached directly to the second downstream conduit.

9. The filter unit according to claim 8, wherein the first and second baffles are between and separate the tube fins attached directly to the first downstream conduit and the tube fins attached directly to the second downstream conduit.

10. A method of filtering air using the filter unit according to claim 9, the method comprising drawing air having grease and oil particulates entrained therein through the housing and then collecting the grease and oil particulates on the first and second entrance fins and the first and second baffles, wherein the air contacts the first and second downstream conduits and the tube fins thereof after most of the grease and oil particulates have been removed from the air.

11. A system comprising:
a cooking surface including a heat source;
an exhaust system adapted to draw in gasses that are disposed above the cooking surface, the exhaust system providing a gas flow path for the gasses;
the filter unit of claim 9 disposed in the gas flow path; and
a fluid supply and a drain line coupled to the heat exchanger of the filter unit.

12. A method of filtering air using a filter unit, the method comprising:
providing a housing having an upstream wall disposed at an upstream side of the housing, a downstream wall disposed at a downstream side of the housing, and a cavity therebetween, the upstream wall having a first entrance opening therein and first and second upstream wall portions separated by the first entrance opening, the downstream wall having first and second exit openings therein and a downstream wall portion between the first and second exit openings, the first entrance opening being disposed in the upstream wall so as to be aligned with the downstream wall portion, the first and second exit openings being disposed in the downstream wall so as to be aligned with, respectively, the first and second upstream wall portions;
providing a heat exchanger disposed within the cavity of the housing, the heat exchanger having fluid flow conduits comprising at least first and second upstream conduits within the first entrance opening, a first downstream conduit within the first exit opening, and a second downstream conduit within the second exit opening, the heat exchanger having tube fins attached directly to the first downstream conduit and tube fins attached directly to the second downstream conduit, wherein the heat exchanger does not have any fins attached directly to the first and second upstream conduits;
causing air to flow through the housing from the first entrance opening to the first and second exit openings, the air entering the first entrance opening flowing between the first and second upstream conduits and then separating into first and second flow portions, the first flow portion flowing around a downstream side of the first upstream conduit, then around an upstream side of the first downstream conduit and through the tube fins attached thereto, then exiting the housing through the first exit opening, and the second flow portion flowing around a downstream side of the second upstream conduit, then around an upstream side of the second downstream conduit and through the tube fins attached thereto, then exiting the housing through the second exit opening.

13. The method according to claim 12, wherein the air has grease and oil particulates entrained therein, the method further comprising collecting the grease and oil particulates with the filter unit, wherein the air contacts the first and second downstream conduits and the tube fins thereof after most of the grease and oil particulates have been removed from the air.

14. The method according to claim 12, the method further comprising providing first and second entrance fins adjacent the first entrance opening, and providing first and second baffles adjacent, respectively, the first and second exit openings.

15. The method according to claim 14, wherein the first flow portion flows between the first entrance fin and the first baffle, and the second flow portion flows between the second entrance fin and the second baffle.

16. The method according to claim 14, the method further comprising collecting grease and oil particulates on the first and second baffles.

17. The method according to claim 16, wherein after the air enters the first entrance opening and flows between the first and second upstream conduits but before the air separates into first and second flow portions, the air impacts a baffle surface between the first and second baffles to initiate separation of grease and oil particulates entrained in the incoming air.

18. The method according to claim 17, wherein the grease and oil particulates collect and coalesce on the baffle surface and then flow on the baffle surface toward a drain hole in the housing.

19. The method according to claim 12, wherein the method is performed in a system comprising a heated cooking surface and an exhaust system drawing the air from the heated cooking surface through the filter unit.

20. The method according to claim 12, wherein each of the first and second flow portions defines an S-shaped flow path through the filter unit.

* * * * *